(12) United States Patent
Lentz et al.

(10) Patent No.: US 10,382,630 B2
(45) Date of Patent: Aug. 13, 2019

(54) TELECOMMUNICATION SERVICE SUBSCRIPTION INTEGRATION SYSTEM

(71) Applicants: Kristoffer Lentz, Snohomish, WA (US); Kimberley Lehrman, Cedar Rapids, IA (US); Mike Schmidt, Swisher, IA (US); Dennis Henderson, Cedar Rapids, IA (US)

(72) Inventors: Kristoffer Lentz, Snohomish, WA (US); Kimberley Lehrman, Cedar Rapids, IA (US); Mike Schmidt, Swisher, IA (US); Dennis Henderson, Cedar Rapids, IA (US)

(73) Assignee: HH Ventures, LLC, Hiawatha, IA (US)

( * ) Notice: Subject to any disclaimer, the term of this patent is extended or adjusted under 35 U.S.C. 154(b) by 0 days.

(21) Appl. No.: 15/679,089

(22) Filed: Aug. 16, 2017

(65) Prior Publication Data

US 2019/0058798 A1 Feb. 21, 2019

(51) Int. Cl.
*H04W 8/20* (2009.01)
*H04M 15/00* (2006.01)
*H04W 4/24* (2018.01)

(52) U.S. Cl.
CPC ....... *H04M 15/771* (2013.01); *H04M 15/705* (2013.01); *H04M 15/72* (2013.01);
(Continued)

(58) Field of Classification Search
CPC .... H04M 15/771; H04M 15/76; H04M 15/85; H04M 15/72; H04M 15/705; H04W 4/24; H04W 8/20
(Continued)

(56) References Cited

U.S. PATENT DOCUMENTS 8,620,265 B1 * 12/2013 Gailloux ............... H04M 15/28
379/114.01
9,794,905 B1 * 10/2017 Chastain ................ H04W 4/70
(Continued)

OTHER PUBLICATIONS

Access from AT&T Frequently Asked Questions, Jun. 24, 2016, pp. 1-5.*
(Continued)

*Primary Examiner* — Said M Elnoubi
(74) *Attorney, Agent, or Firm* — Han Santos, PLLC

(57) ABSTRACT

This disclosure describes a Telecommunications Service Subscription Integration (TSSI) system that generates an integrated service subscription for a client device operating on a telecommunications network. The integrated service subscription may aggregate service features from multiple service subscriptions, and prioritize application of one service subscription within the integrated service subscription over another, or one service feature within the integrated service subscription over another. The TSSI system may also determine whether client eligibility for a service subscription is current or has lapsed. In doing so, the integrated service subscription may be adjusted to remove ineligible service subscriptions and re-prioritize remaining service features. The TSSI system may monitor usage of an integrated service subscription and recommend additional, or alternative, service subscriptions. The TSSI system may parse through client usage data to determine a suitability score for individual service features, and in doing so, recommend an additional, or alternative, service subscription based on suitability scores.

20 Claims, 7 Drawing Sheets

(52) U.S. Cl.
    CPC .......... *H04M 15/76* (2013.01); *H04M 15/85* (2013.01); *H04W 4/24* (2013.01); *H04W 8/20* (2013.01)

(58) Field of Classification Search
    USPC ............... 455/405–408; 379/114.01, 114.03, 379/114.16, 114.17, 130, 131, 140
    See application file for complete search history.

(56) References Cited

U.S. PATENT DOCUMENTS

| | | | | |
|---|---|---|---|---|
| 2008/0160955 | A1* | 7/2008 | Giesecke | H04M 15/00 455/406 |
| 2017/0127104 | A1* | 5/2017 | Thomas | H04N 21/2543 |
| 2017/0164184 | A1* | 6/2017 | Borse | H04W 8/183 |
| 2017/0201850 | A1* | 7/2017 | Raleigh | H04W 4/50 |

OTHER PUBLICATIONS

Access from AT&T Frequently Asked Questions [online] [retrieved on Oct. 23, 2017 from address https://accessatt.solixcs.com/#/home].*

* cited by examiner

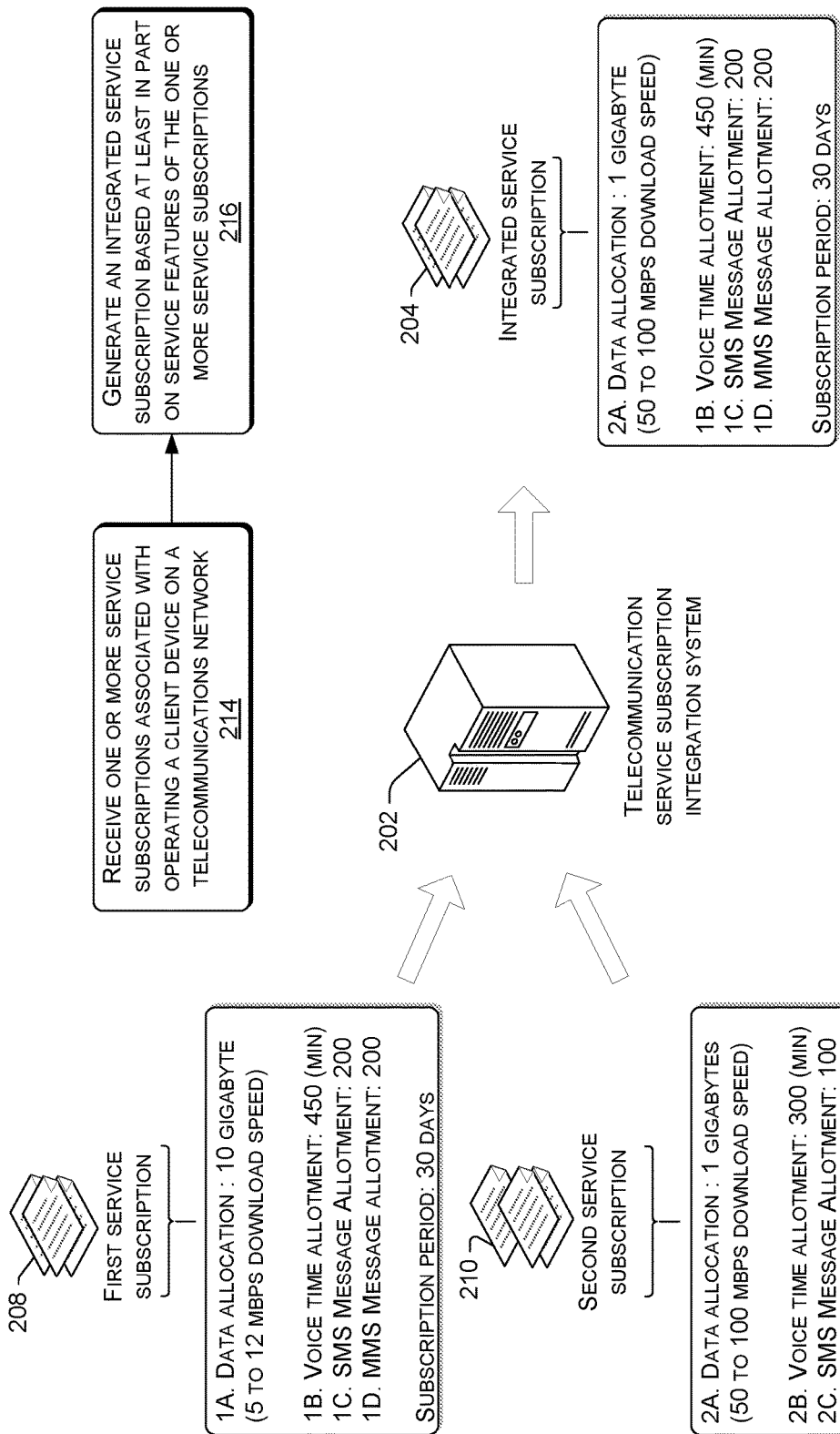

TELECOMMUNICATION SERVICE SUBSCRIPTION INTEGRATION SYSTEM

BACKGROUND

Present day, advances in technology have resulted in smaller and more powerful computing devices and the elimination of more traditional communication mechanisms such as landlines, desktop computers, and laptop computers. Particularly, access to the internet and other essential services through mobile devices over a telecommunications network has made subscription mobile service a basic human necessity to adequately function socially and professionally. However, the high cost of mobile service subscriptions can cause a segment of the U.S. population to not be able to afford or intermittently loose access to their mobile services for a variety of reasons, including non-payment of mobile service subscription fees. As a result, some consumers rely on maintaining a second, backup mobile device that is configured to operate a low-cost or free baseline service subscription during times when their primary, higher-valued service subscription has lapsed. However, maintaining a back-up mobile device and a separate, primary mobile device can be cumbersome, and can often mean that a consumer is left without access to telecommunications services until they have physically located, and secured their back-up mobile device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A and 2B illustrate block diagrams of the TSSI system that is configured to generate an integrated service subscription by aggregating service features associated with a first and second service subscriptions.

DETAILED DESCRIPTION

Figure 1:
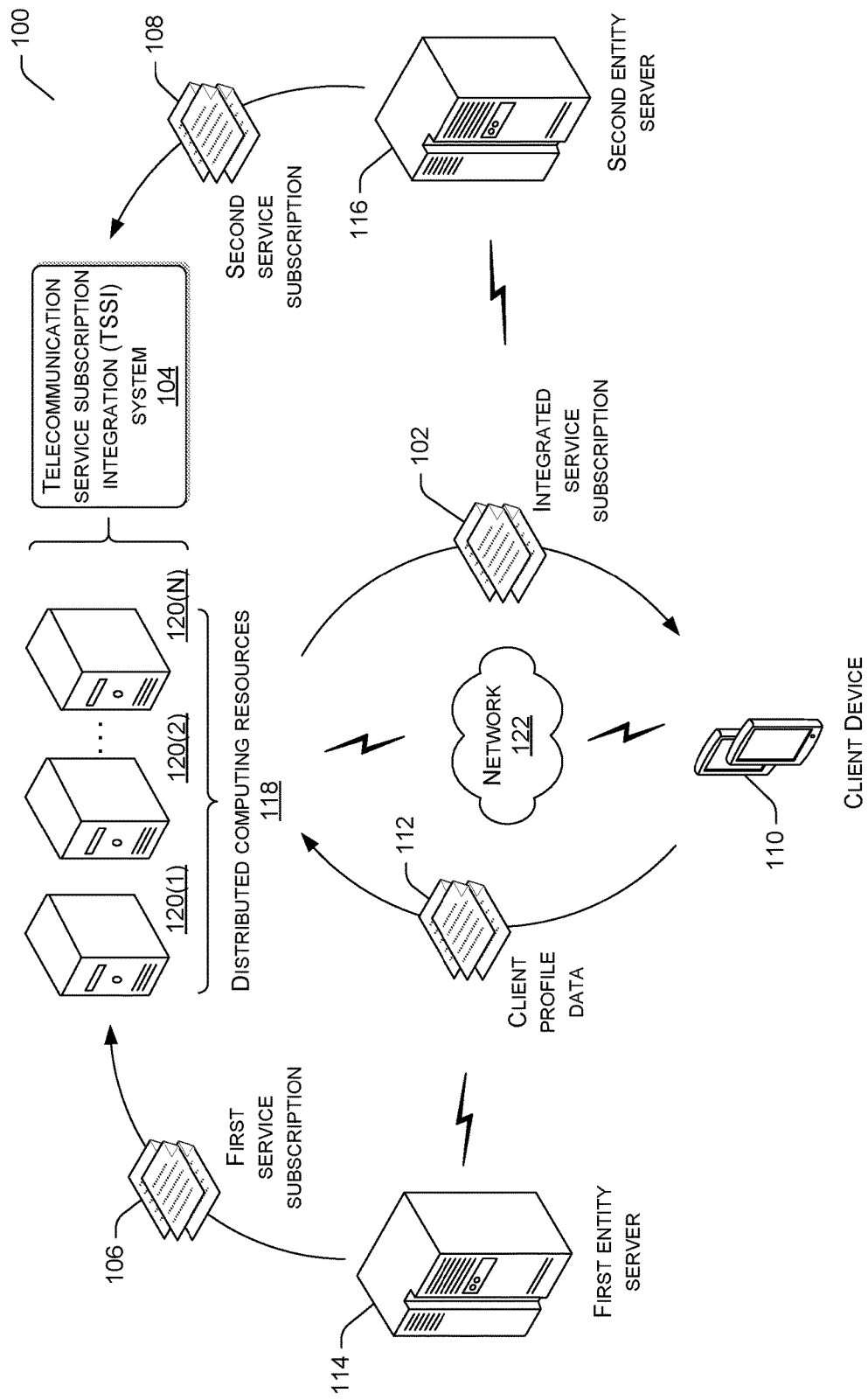
FIG. 1 illustrates a schematic view of a computing environment that facilitates generating an integrated service subscription for voice and data communications over a telecommunications network.

This disclosure describes techniques that facilitate generating an integrated service subscription for various types of telecommunications services, including voice and data communications, over a telecommunications network. Particularly, a Telecommunications Service Subscription Integration (TSSI) system is described that can generate an integrated service subscription that aggregates any number of client-subscribed service subscriptions for telecommunications services over a telecommunications network. In doing so, a client may use the integrated service subscription to operate a client device over a telecommunications network, without regard for which of the multiple client-subscribed service subscriptions is being used to provide telecommunications services. The TSSI system may generate an integrated services subscription based on one or more priority rules, as discussed in more detail below. The priority rules may be based at least in part on client input from a client associated with a client device (or SIM), a user input from an operator of the TSSI system, or a user input from an operator associated with the telecommunications service provider.

In various examples, the TSSI system may be part of a mobile virtual network operator (MVNO) that provides telecommunications services under license to a Mobile Network Operator (MNO). In this example, the telecommunications service provider may provide the MVNO with the network infrastructure and related services. In another example, the TSSI system may be affiliated and/or operate within an MNO core network, or communicate directly or indirectly with an MNO for the purpose of facilitating client-subscribed service subscriptions associated with the MNO. Hereinafter, the term "telecommunications service providers" may refer to MVNOs and MNOs.

In one example, the TSSI system may generate an integrated service subscription by selectively prioritizing the use of a first service subscription over the use of a second service subscription. In this way, a client may selectively benefit from using a preferred service subscription, over other less favored service subscriptions. By way of example, consider a client subscribing to a low cost or free, first service subscription that only provides a limited scope of telecommunications services, such as 300 minutes (min) time allotment for voice communications and a 1 Gigabyte (Gb) data allotment at 5 to 12 Megabits per second (Mbps) download speed for data communications. The client may further subscribe to a more expensive, second service subscription (i.e., 450 min time allotment for voice communications and a 10 Gb data allotment at 50 to 100 Mbps download speed for data communications) that offers improved telecommunications services, relative to the first service subscription. In this example, the client may preferentially prioritize the use of the second service subscription over use of the first service subscription. Thus, the integrated service subscription may be configured to prioritize use of the second service subscription over use of the first service subscription based on client preference.

In another example, the TSSI system may generate an integrated service subscription by selectively prioritizing the use of a particular service feature from a first service subscription over the use of a similar type of service feature in a second service subscription. By way of example, consider a client subscribing to a first service subscription that includes an unlimited time allotment for voice communications and a 1 Gb data allotment at 5 to 12 Mbps for data communications. The client may further subscribe to a second service subscription that includes a limited, 300 min time allotment for voice communications and a 10 Gb data allotment at 50 to 100 Mbps for data communications. In this example, the TSSI system may generate an integrated service subscription that selectively prioritizes use of the unlimited time allotment for voice communications associated with the first service subscription and the 10 Gb data allotment at 50 to 100 Mbps for data communications associated with the second service subscription, based at least in part on client preference. In this way, the client may simultaneously benefit from a preferred use of voice and data service features from both the first service subscription and the second service subscription.

In another example, the TSSI system may generate an integrated service subscription that aggregates non-overlapping service features associated with a first service subscription and a second service subscription. By way of example, consider a client subscribing to a first service subscription that includes a time allotment for voice communications, an allotment of SMS messages, and an allotment of MMS messages. The client may further subscribe to a second service subscription that includes a data allotment for data communications. In this example, the TSSI system may generate an integrated service subscription that aggregates the first service subscription and the second service subscription such that the service features from both are accessible to a client device simultaneously. In some examples, a first service subscription and a second service subscription may include non-overlapping service features and overlapping service features. In these examples, the TSSI system may generate the integrated service subscription to aggregate non-overlapping service features for use simultaneously, and may prioritize use of overlapping service features, as discussed in an earlier example.

In various examples, the TSSI system may also adjust an integrated service subscription to account for changes in a client's circumstances. For example, after having subscribed to a first service subscription and a second service subscription, and then prioritizing use of the second service subscription over the first service subscription, the client may selectively unsubscribe from the second service subscription, or may have the client's enrollment in the second service subscription involuntarily suspended or disqualified. In these instances, the TSSI system may automatically re-prioritize use of the first service subscription. In this way, the client may continue to seamlessly operate the client device over the telecommunications network, without regard or delay as to which service subscription is being used to provide telecommunications services.

Moreover, the TSSI system may determine whether a client is eligible for a particular service subscription, such as a government subsidized service subscription, and in doing so facilitate enrollment, based at least in part on client profile data. By way of example, the TSSI system may determine client eligibility for a free or low-cost service subscription, whereby eligibility is based on a set of qualifying criteria. The qualifying criteria may include an earned annual income that is less than a predetermined income threshold, enrollment in one or more government assistance programs, a combination of both, or any other qualifying criteria by which the government entity offers the service subscription. In this example, the TSSI system may determine client eligibility based on client profile data. Client profile data may include a client residential geographic location, level of education, employment status, employment place, annual income, an indication of enrollment within one or more government assistance programs, or any combination thereof.

In one example, the TSSI system may receive a client request to enroll in the particular service subscription, and in doing so, determine eligibility. In another example, the TSSI system may, absent a client request and without client interaction, independently determine whether a client is eligible for a particular service subscription, and in doing so, notify the client in response to affirmatively determining eligibility.

In some examples, the TSSI system may independently determine that a client is no longer eligible for a currently-subscribed service subscription, or has been disqualified from enrollment to a currently subscribed service subscription. In doing so, the TSSI system may adjust the integrated service subscription to remove the ineligible service subscription.

In various examples, the TSSI system may also monitor usage of an integrated service subscription by a client device (or SIM) over the telecommunications network to provide one or more recommendations of suitable service subscriptions. For example, the TSSI system may parse client data associated with usage of the integrated service subscription on the telecommunications network, and determine a suitability score for one or more service features associated with the integrated service subscription. The suitability score may quantify whether an allotment associated with each service feature correlates with actual client usage. The suitability score may be alpha-numeric (i.e., 0 to 10, or A to F), descriptive (i.e., low, medium, or high), based on color (i.e., red, yellow, or green), or any other suitable rating scale, or any combination thereof. In doing so, the TSSI system may recommend an additional service subscription that includes a recommended service feature.

Throughout this disclosure, the term "service subscription," as used herein, describes a client subscription to telecommunications services provided by a telecommunications service provider for a predetermined subscription period. More specifically, a service subscription may provide a subscribing client with access to one or more types of telecommunications services, including government subsidized service features provided by a telecommunications service provider. The term "service features" is used interchangeably throughout this disclosure to describe telecommunications services. By way of example, service features may include, a time allotment for voice communications over a telecommunications network, an allotment of short messaging service (SMS) messages, an allotment for multimedia messaging service (MMS) messages, an allotment of unstructured supplementary service data (USSD) communications messages, a data allotment for data communications, a data allotment for Voice over Internet Protocol (VoIP) communications, and/or any other service feature that may be fulfilled via a client device and over a telecommunications network associated with the telecommunications service provider. Further, the subscription period may be defined by the telecommunications service provider, and may comprise of one day, one week, thirty days, or a calendar month. Any subscription period is possible. Further, a service subscription may A service subscription may include a subscription fee that is prepaid, postpaid, paid in advance or subject to any other agreed upon payment method.

Moreover, a service subscription may be tied to a client device or a subscriber identity module (SIM) associated with a telecommunications service provider. For example, a telecommunications service provider that operates a Code Division Access (CDMA) network may associate a service subscription for telecommunications services over the CDMA network, directly with a client device. Alternatively, a telecommunications service provider that operates a Global System for Mobile Communications (GSM) network may associate a service subscription for telecommunications services over a GSM network with a SIM that may be transferred between multiple client devices.

Additionally, the term "similar types of service feature" is used throughout the disclosure to describe service features that cater to a same mode of communication (i.e., voice or data communication), but do not necessarily share a same or similar service allocation. For example, consider a first voice communication service feature of a first service subscription that has a limited allocation for SMS and MMS messages and a second voice communication service feature of a second service subscription that has an unlimited allocation for SMS and MMS messages. In this example, the first service feature and the second service feature are considered to be of "similar types of service," primarily because each relates to voice communications. Similarly, a first data service feature of a first service subscription having a limited allocation for data communications and a second data service feature of a second service subscription having an unlimited allocation are considered to be of "similar types of service feature."

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates generating an integrated service subscription 102 for voice and data communications over a telecommunications network. Particularly, a Telecommunications Service Subscription Integration (TSSI) system 104 may determine an eligibility of a client to enroll in one or more service subscriptions that facilitate operation of a client device on the telecommunications network. Each service subscription may provide a client device with access to service features on the telecommunications network for a predetermined subscription period. The service features may include voice communications, a short messaging service (SMS), a multimedia messaging service (MMS), unstructured supplementary service data (USSD) communications, data communications, Voice over Internet Protocol (VoIP) communications, or any other service subscription that may be fulfilled via a client device and telecommunications network. Further, the subscription period may be defined by the telecommunications service provider, and may comprise of one day, one week, thirty days, or a calendar month. Any subscription period is possible.

The TSSI system 104 may identify one or more service subscriptions associated with the operation of a client device on the telecommunications network. In one example, the TSSI system 104 may generate an integrated service subscription 102 that prioritizes application of a first service subscription 106 over a second service subscription 108. In this example, the integrated service subscription 102 may selectively prioritize applying the first service subscription 106 to service operations associated with the client device over the telecommunications network. If the client becomes ineligible or is disqualified from accessing the first service subscription 106 (i.e., through non-payment of subscription fees or loss of eligibility), or if a service feature allotment associated with the first service subscription 106 is exhausted, the integrated service subscription 102 may automatically revert to the second service subscription. In another example, the TSSI system 104 may generate an integrated service subscription 102 that prioritizes individual service features from among one or more service subscriptions. In this example, the TSSI system 104 may configure the integrated service subscription 102 to selectively prioritize applying service features associated with the first service subscription 106 to any service operations associated with the client device (or SIM) over the telecommunications network. If an allotment of a service feature associated with the first service subscription 106 is exhausted through use by the client device (or SIM), and before an expiration of a subscription period, the integrated service subscription 102 may automatically revert to a similar type of service feature from the second service subscription 108 for the remaining portion of the subscription period. By way of example, consider an integrated service subscription 102 that includes a first service subscription and a second service subscription. The first service subscription may include a first data service feature that includes a 10 gigabyte (Gb) data allocation and 5 to 12 megabits per second (Mbps) download speed. Further, the second service subscription 108 may a second data service feature that includes a 5 Gb data allocation and a 50 to 100 Mbps download speed. In this example, the TSSI system 104 may selectively prioritize use of the second service subscription 108 over the first service subscription 106, based on a comparison of download speeds (i.e., 50 to 100 Mbps vs 5 to 12 Mbps). Thus, if the allotment of 5 Gb associated with the second service subscription 108 is exhausted before the end of the subscription period, the integrated service subscription 102 may be configured to automatically revert to the first service feature (i.e., a similar type of service feature) of the first service subscription 106 (i.e., 10 Gb data allocation, 5 to 12 Mbps download speed).

In the illustrated example, the TSSI system 104 may determine whether a client device 110 (or SIM) is eligible for one or more service subscriptions, based at least in part on client profile data 112. Client profile data 112 may include a client residential geographic location, level of education, employment status, employment place, annual income, an indication of enrollment within one or more government assistance programs, or any combination thereof.

Moreover, the TSSI system 104 may receive a first service subscription 106 from a first entity server 114, and a second service subscription 108 from a second entity server 116. The first entity server 114 and second entity server 116 may be associated with a government entity or a non-government entity, each of which may be further affiliated with the telecommunications service provider. Further, even though FIG. 1 illustrates receiving a first service subscription 106 and second service subscription 108 from a respective first entity server 114 and second entity server 116, the TSSI system 104 may receive any number of service subscriptions from any number of entities, upon which the service subscriptions are aggregated to generate the integrated service subscription 102.

In the illustrated example, the TSSI system 104 may operate on one or more distributed computing resource(s) 118. The one or more distributed computing resource(s) 118 may include one or more computing device(s) 120(1)-120(N) that operate in a cluster or other configuration to share resources, balance load, increase performance, provide failover support or redundancy, or for other purposes. The one or more computing device(s) 120(1)-120(N) may include one or more interface(s) to enable communications with other networked devices, such as one of client device 110, via one or more network(s) 122. The one or more network(s) 122 may include public networks such as the Internet, private networks such as an institutional and/or personal intranet, or some combination of private and public networks. The private and public networks may be controlled by one or more entities, and correspond to social networks, club affiliation networks, cloud-sourced networks, or any combination thereof. The one or more network(s) 122 can also include any type of wired and/or wireless network, including but not limited to local area network (LANs), wide area networks (WANs), satellite networks, cable networks, Wi-Fe networks, Wi-Max networks, mobile communications networks (e.g., 3G, 4G, and so forth), or any combination thereof.

Further, the client device 110 may include any sort of electronic device, such as a cellular phone, a smart phone, SIM card, feature phone, a tablet computer, an electronic reader, a media player, a gaming device, a personal computer (PC), a laptop computer, etc. The client device 110 may include a subscriber identity module (SIM), such as an eSIM, to identify the client device 110 to a telecommunication service provider network (also referred to herein, as "telecommunication network").

Figure 2A:
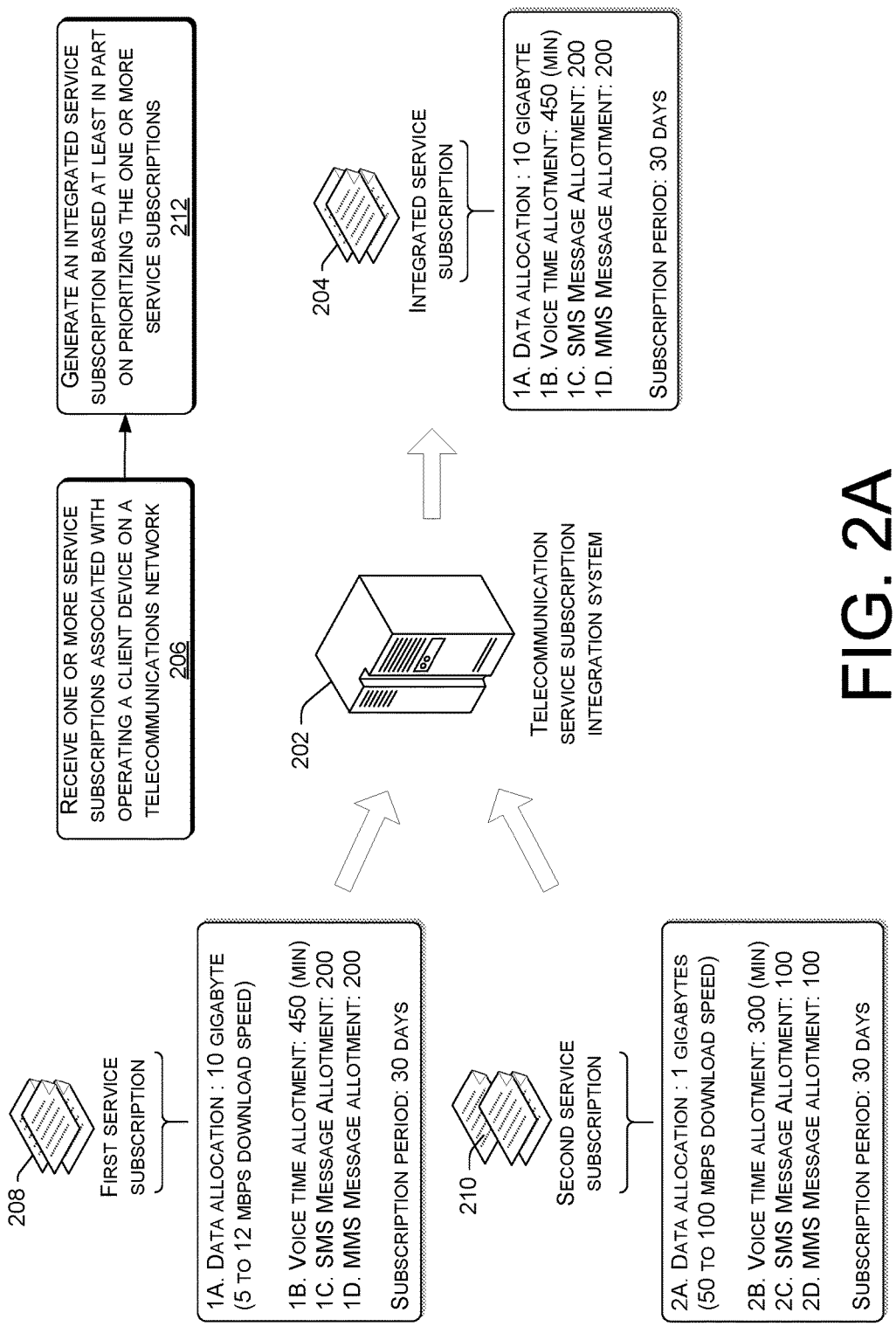

FIGS. 2A and 2B illustrate block diagrams of the TSSI system 202 that is configured to generate an integrated service subscription by aggregating service features associated with a first service subscription and a second service subscription. It is noteworthy that the integrated service subscription may aggregate any number of service subscriptions. FIG. 2A illustrates a TSSI system 202 configured to generate the integrated service subscription 204 by prioritizing application of one service subscription over another. FIG. 2B illustrates a TSSI system 202 configured to generate an integrated service subscription 204 by prioritizing application of individual services features associated with one of the first service subscription or the second service subscriptions.

Referring to FIG. 2A, at block 206, the TSSI system 202 may receive a first service subscription 208 and a second service subscription 210. In the illustrated example, the first service subscription 208 may include service features associated with a client device (or SIM) for operations over a telecommunications network. By way of example, the service features may include a data allocation (i.e., one gigabyte at a 50 to 100 Mbps download speed) for data communications, a time allotment (i.e., 450 min) for voice communications, an allotment of SMS messages (200 messages) and an allotment of MMS messages (i.e., 200 messages).

Additionally, the service features associated with the second service subscription 210 may include a data allocation (i.e., 10 Gb at a 5 to 12 Mbps download speed) for data communications, a time allotment (i.e., 300 min) for voice communications, an allotment of SMS messages (i.e., 100 messages) and an allotment of MMS messages (i.e., 100 messages).

At block 212, the TSSI system 202 may generate an integrated service subscription 204 by prioritizing application of one service subscription over another. In this example, the TSSI system 202 may prioritize the first service subscription 208 over the second service subscription 210, based at least in part one or more priority rules. The priority rules may be based at least in part on client input from a client associated with a client device (or SIM), a user input from an operator of the TSSI system 202, or a user input from an operator associated with the telecommunications service provider. In doing so, the integrated service subscription 204 may selectively prioritize applying service features from the first service subscription 208 to any voice and/or data service operations performed by the client device (or SIM) over the telecommunications network. If the client becomes ineligible or is disqualified from accessing the first service subscription 208 (i.e., through non-payment of subscription fees and/or so forth), or if a service feature allotment associated with the first service subscription 208 is exhausted, the integrated service subscription 204 may automatically apply services features from the second service subscription 210 for at least the remaining portion of the subscription period. By way of example, and as illustrated in FIG. 2A, consider an integrated service subscription 204 that is configured to prioritize use of the first service subscription 208 over the second service subscription 210. The service features associated with the first service subscription 208 include a data allocation of 10 Gb at 5 to 12 Mbps download speed, a 450 min time allotment for voice communications, a 200 SMS message allotment, and a 200 MMS message allotment. Further, consider a scenario in which the time allotment of 450 min for voice communications (i.e., prioritized first service subscription 208) is exhausted prior to the end of the subscription period. In this instance, the TSSI system 202 may cause the integrated service subscription 204 to automatically apply the service features associated with the second service subscription 210, which include a data allocation of 1 Gb at 50 to 100 Mbps download speed, a 300 min time allotment for voice communications, a 100 SMS message allotment, and a 100 MMS message allotment.

A benefit of prioritizing a first service subscription over a second service subscription is evident when a client becomes ineligible to access service features associated with the first service subscription. In this example, the TSSI system 202 may adjust the integrated service subscription 204 to automatically apply the second service subscription to ensure continuity of voice and data services.

Referring to FIG. 2B, at block 214, the TSSI system 202 may receive the first service subscription 208 and a second service subscription 210. At block 216, the TSSI system 202 may generate an integrated service subscription 204 by prioritizing individual service features from the first service subscription 208 and the second service subscription 210, based at least in part on a client input from a client associated with the client device (or SIM), user input from an operator of the TSSI system 202, or user input from an operator associated with the telecommunications service provider. In the illustrated example, the TSSI system 202 may generate the integrated service subscription 204 by selectively prioritizing the data allocation of 1 Gb at a 50 to 100 Mbps download speed that is associated with the second service subscription 210, and the remaining service features from the first service subscription 208, namely a 450 min time allotment for voice communications, a 200 SMS message allotment, and a 100 MMS message allotment.

In the event that a prioritized service feature from the integrated service subscription 204 is exhausted, the TSSI system 202 may cause the integrated service subscription 204 to apply a similar type of service feature from another service subscription received by the TSSI system 202. Continuing with the example shown in FIG. 2B, consider a client exhausting the data allocation associated with the integrated service subscription (i.e., prioritized from the second service subscription 210), namely 1 Gb at a 50 to 100 Mbps download speed, before the end of a subscription period. In this instance, the TSSI system 202 may configure the integrated service subscription 204 to apply the data allocation associated with the first service subscription, namely 10 Gb at a 5 to 12 Mbps download speed.

Figure 3:
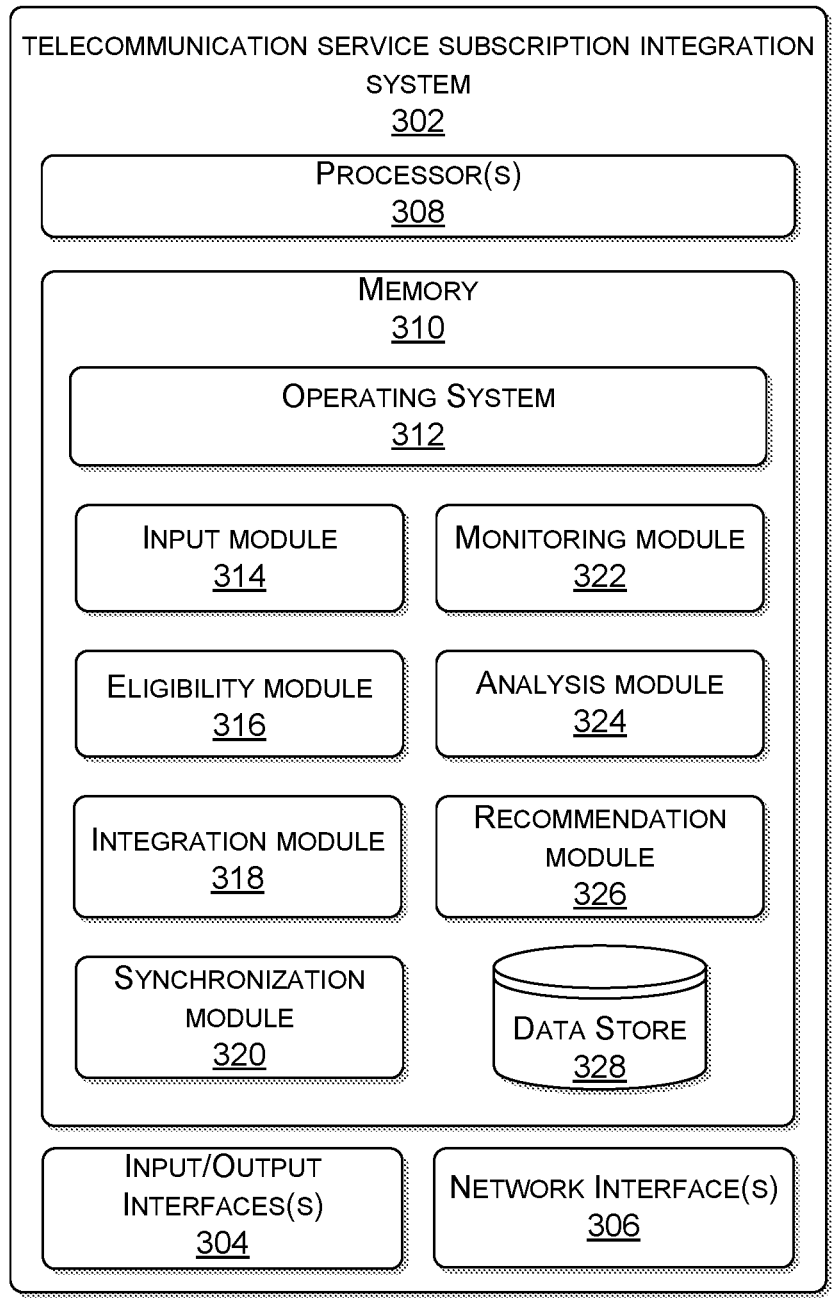
FIG. 3 illustrates a block diagram of the TSSI system that facilitates generating an integrated service subscription for voice and data communications over a telecommunications network.

FIG. 3 illustrates a block diagram of the Telecommunications Service Subscription Integration (TSSI) system 302 that facilitates generating an integrated service subscription for voice and data communications over a telecommunications network. The TSSI system 302 may include routines, program instructions, objects, and/or data structures that perform particular tasks or implement abstract data types. Further, the TSSI system 302 may include input/output interface(s) 304. The input/output interface(s) 304 may include any type of output interface known in the art, such as a display (e.g., a liquid crystal display), speakers, a vibrating mechanism, or a tactile feedback mechanism. Input/output interface(s) 304 also include ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the TSSI system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface(s) 306 may include wired communication components, such as an Ethernet port or a Universal Serial Bus (USB).

Further, the TSSI system 302 may include one or more processor(s) 308 that are operably connected to memory 310. In at least one example, the one or more processor(s) 308 may be a central processing unit(s) (CPU), graphics processing unit(s) (GPU), a both a CPU and GPU, or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or nonvolatile (ROM) memory.

In some examples, memory 310 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, an input module 314, an eligibility module 316, an integration module 318, a synchronization module 320, a monitoring module 322, an analysis module 324, a recommendation module 326, and a data store 328. The operating system 312 may be any operating system capable of managing computer hardware and software resources.

The input module 314 may receive one or more service subscriptions associated with operating a client device (or SIM) on the telecommunications network. The input module 314 may receive each service subscription from a government entity, or a non-government entity, each of which may be affiliated with the telecommunications service provider. Further, the input module 314 may receive client profile data associated with a client device operating on the telecommunication network. The client profile data may include a client residential geographic location, level of education, employment status, employment place, annual income, an indication of enrollment within one or more government assistance programs, or any combination thereof. In some examples, the client profile data may be used to determine whether a client device is eligible for one or more service subscriptions.

Further, the input module 314 may further receive a priority order that is associated with prioritizing service subscriptions within an integrated service subscription, or service features within an integrated service subscription. In some examples, the input module 314 may receive the priority order via a client input from a client associated with a client device (or SIM), a user input from an operator of the TSSI system 302, or a user input from an operator associated with the telecommunications service provider.

In the illustrated example, the eligibility module 316 may determine whether a client device is eligible for one or more service subscriptions. In some examples, eligibility criteria may be defined by criteria external to the TSSI system 302, such as a government entity. In a non-limiting example, a government entity may offer a free or low-cost service subscription, whereby eligibility is based on a set of qualifying criteria. The qualifying criteria may include an earned annual income that is less than a predetermined income threshold, enrollment in one or more government assistance programs, a combination of both, or any other qualifying criteria by which the government entity offers the service subscription. In this example, the eligibility module 316 may retrieve client profile data, from the data store 328, to determine whether the client meets the set of qualifying criteria.

Further, the eligibility module 316 may determine whether a client is no longer eligible, or has been disqualified from a service subscription, based at least in part the set of qualifying criteria. Particularly, the eligibility module 316 may determine whether a client is no longer eligible for a service subscription based on non-payment of a subscription fee, or a change in client profile data. For example, a client may have initially been eligible for a free, or low-cost, service subscription based on a reported annual income, or enrollment in one or more government assistance program, or a combination of both. However, the eligibility module 316 may determine that the client no longer satisfies the eligibility criteria (i.e., annual income is above a predetermined income threshold or the client is no longer enrolled in a government assistance program), the client may no longer be eligible for the free, or low-cost, service subscription.

In the illustrated example, the integration module 318 may generate an integrated service subscription for use by the client device on the telecommunication network. Particularly, the integration module 318 may aggregate a first service subscription and a second service subscription, such that a client device may concurrently use service features from both service subscriptions without having to actively switch from one service subscription to the other. In one example, the first service subscription and the second service subscription may complement one another, without including overlapping service features. For example, the first service subscription may offer a time allotment for voice communications, an allotment of SMS messages, and an allotment of MMS messages, while the second service subscription may include a data allotment for data communications. In this example, the integration module 318 may aggregate the first service subscription and the second service subscription such that the service features from both are accessible simultaneously, rather than based on priority.

In another example, the first service subscription and the second service subscription may include overlapping service features, such as a time allotment for voice communications or a data allotment for data communications. In these examples, the integration module 318 may prioritize application of one service subscription over another, or one service feature within a service subscription over a similar type of service feature in another service subscription, each of which are discussed in more detail below.

The integration module 318 may determine a priority order of service subscriptions, or service features, based at least in part on one or more priority rules. The priority rules may be based at least in part on client input from a client associated with a client device (or SIM), a user input from an operator of the TSSI system 302, or a user input from an operator associated with the telecommunications service provider.

By way of example, consider an integrated service subscription that includes a first service subscription and a second service subscription. The integration module 318 may selectively configure the integrated service subscription to apply a first set of service features (i.e., time allotment for voice communications and data allotment for data communications) from the first service subscription in lieu of a second set of service features from the second service subscription. If the client becomes ineligible or is disqualified from accessing the first service subscription (i.e., through non-payment of subscription fees and/or so forth), or if a service feature allotment associated with the first service subscription is exhausted through use by the client device, and before an expiration of the subscription period, the integration module 318 may configure the integrated service subscription to automatically apply service features from the second service subscription for at least the remaining portion of the subscription period.

In another example, the integration module 318 may generate an integrated service subscription by selectively prioritizing application of individual service features from among the first service subscription and the second service subscription. The integration module 318 may determine a priority order of service features, based at least in part on client input via a client associated with a client device (or SIM), user input from an operator of the TSSI system 302, or user input from an operator of the telecommunications network.

In the illustrated example, the synchronization module 320 may synchronize the integrated service subscription with a client account associated with the telecommunications service provider. Further, the synchronization module 320 may integrate billing policies associated with the integrated service subscription with a charging engine of the telecommunications network. In some examples, the TSSI system may synchronize billing policies associated with the integrated service subscription with a Policy and Charging Rules Function (PCRF) of a Policy Control and Charging (PCC) architecture associated with the telecommunications network.

In the illustrated example, the monitoring module 322 may retrieve client data from a client device on a continuous basis, per a predetermined schedule, or in response to a triggering event. The client data may relate to usage of service features associated with the integrated service subscription by the client device (or SIM) on the telecommunications network. Further, the predetermined schedule may correspond to a predetermined time interval, such as one hour, three hours, or 24 hours. Any predetermined time interval is possible. Moreover, the triggering event may correspond to receipt of an indication that the integrated service subscription has exceeded an allotment associated with voice or data communications over the telecommunications network. Further, the triggering event may correspond to receipt of an indication that a client is no longer eligible, or has been disqualified, from an individual service subscription associated with the integrated service subscription.

In the illustrated example, the analysis module 324 may parse client data, from the monitoring module 322, to determine a suitability score for one or more service features associated with the integrated service subscription. The suitability score may quantify whether an allotment associated with a service feature correlates with the actual client usage. The suitability score may be alpha-numeric (i.e., 0 to 10, or A to F), descriptive (i.e., low, medium, or high), based on color (i.e., red, yellow, or green), or any other suitable rating scale, or any combination thereof.

In a non-limiting example, an integrated service subscription may include a data allotment of five gigabytes per 30-day subscription period. The TSSI system may parse client data to determine that data usage over the first ten days of the subscription period amounts to four gigabytes (i.e., 80% of the data allotment used over 33% of the subscription period). Thus, the suitability score associated with the data allocation service feature may be expressed as a low score (i.e., 0 to 3, low, or red), indicating that the current data allocation service feature is unsuitably low relative to actual client usage.

Further, the analysis module 324 may determine whether the suitability score associated with a service feature of the integrated service subscription is less than a predetermined suitability threshold. The predetermined suitability threshold may be set by an operator of the TSSI system 302, or a client associated with the client device. In one example, the predetermined suitability threshold may correspond to a mean score value of the suitability score (i.e., a mean value may be expressed as 5, medium, or yellow). In other words, a service feature with a suitability score that is less than a predetermined suitability threshold suggests that the service feature does not correlate with actual client usage of the service feature.

Moreover, the analysis module 324 may further parse through individual service subscriptions within a data store 328 to identify additional service subscriptions with similar type of service features to a service feature with a low suitability score (i.e., 0 to 3, low, or red). The analysis module 324 may further determine suitability scores for each of the additional service subscriptions.

In the illustrated example, the recommendation module 326 may generate one or more recommendations to adjust a service feature associated with the integrated service subscription, based at least in part on a relative suitability score of the service feature within the integrated service subscription, and a service feature within an additional service subscription.

In some examples, the one or more recommendations may be based on criteria other than relative suitability scores. For example, the one or more recommendations may be based on the subscription fee associated with addition service subscriptions.

In the illustrated example, the data store 328 may include a record of client profile data and one or more additional service subscriptions. The client profile data may include a client residential geographic location, level of education, employment status, employment place, annual income, an indication of enrollment within one or more government assistance programs, or any combination thereof. The additional service subscriptions may provide a client device with access to service features on the telecommunications network for a predetermined subscription period. The service features may include voice communications over the telecommunications network, a short messaging service (SMS), a multimedia messaging service (MMS), data communications over the telecommunications network, or any combination thereof. Further, the subscription period may be defined by the telecommunications service provider, and may comprise of one day, one week, thirty days, or a calendar month. Any subscription period is possible. Further, the data store 328 may further include a record of the one or more priority rules used to determine a priority order of service subscription or service features associated with an integrated service subscription. In some examples, the one or more priority rules may be based at least in part on client input from a client associated with a client device (or SIM), a user input from an operator of the TSSI system, or a user input from an operator associated with the telecommunications service provider.

Figure 4:
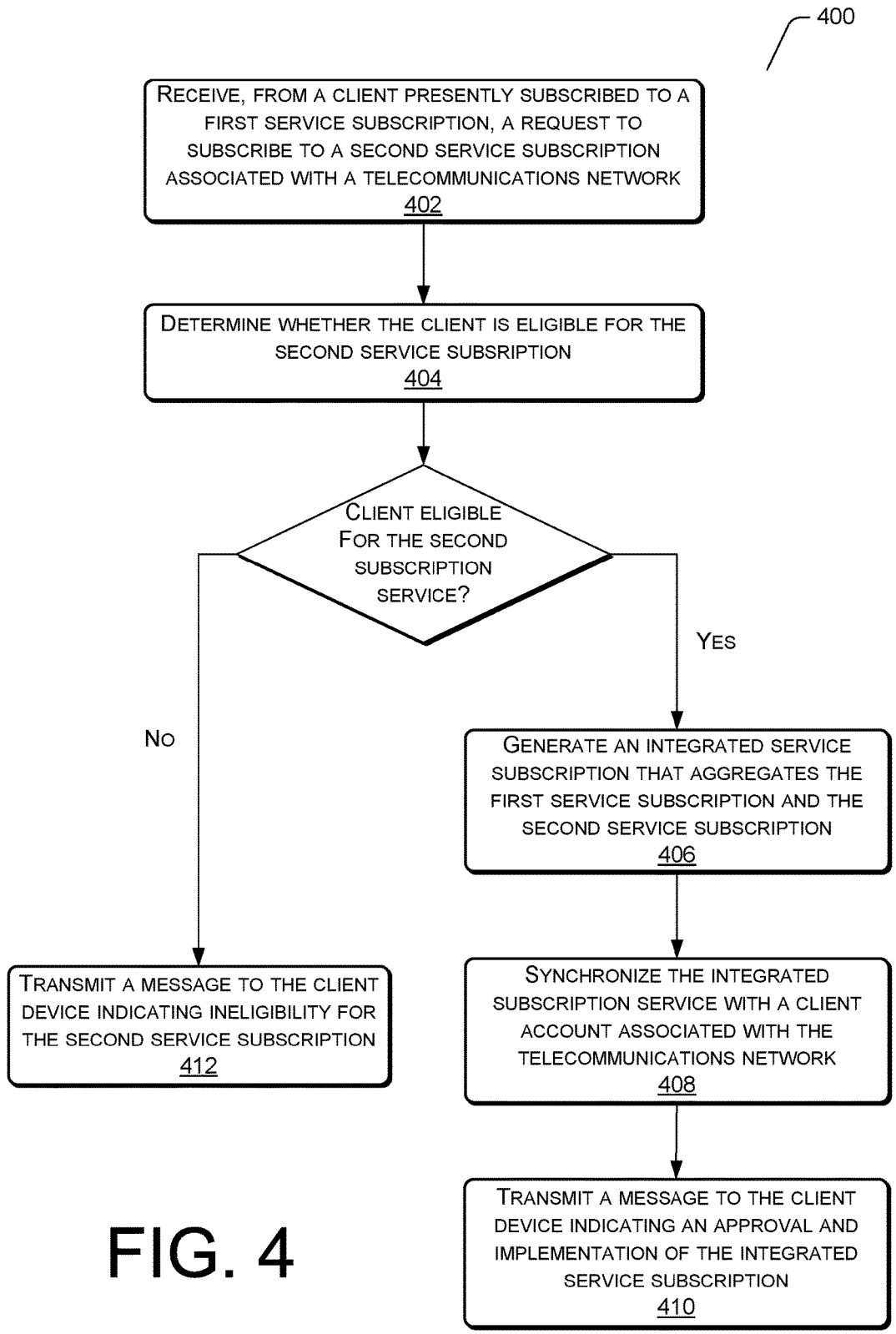
FIG. 4 illustrates a block diagram of a telecommunication service subscription integration (TSSI) system that generates an integrated service subscription for voice and data communications over a telecommunications network.
Figure 5:
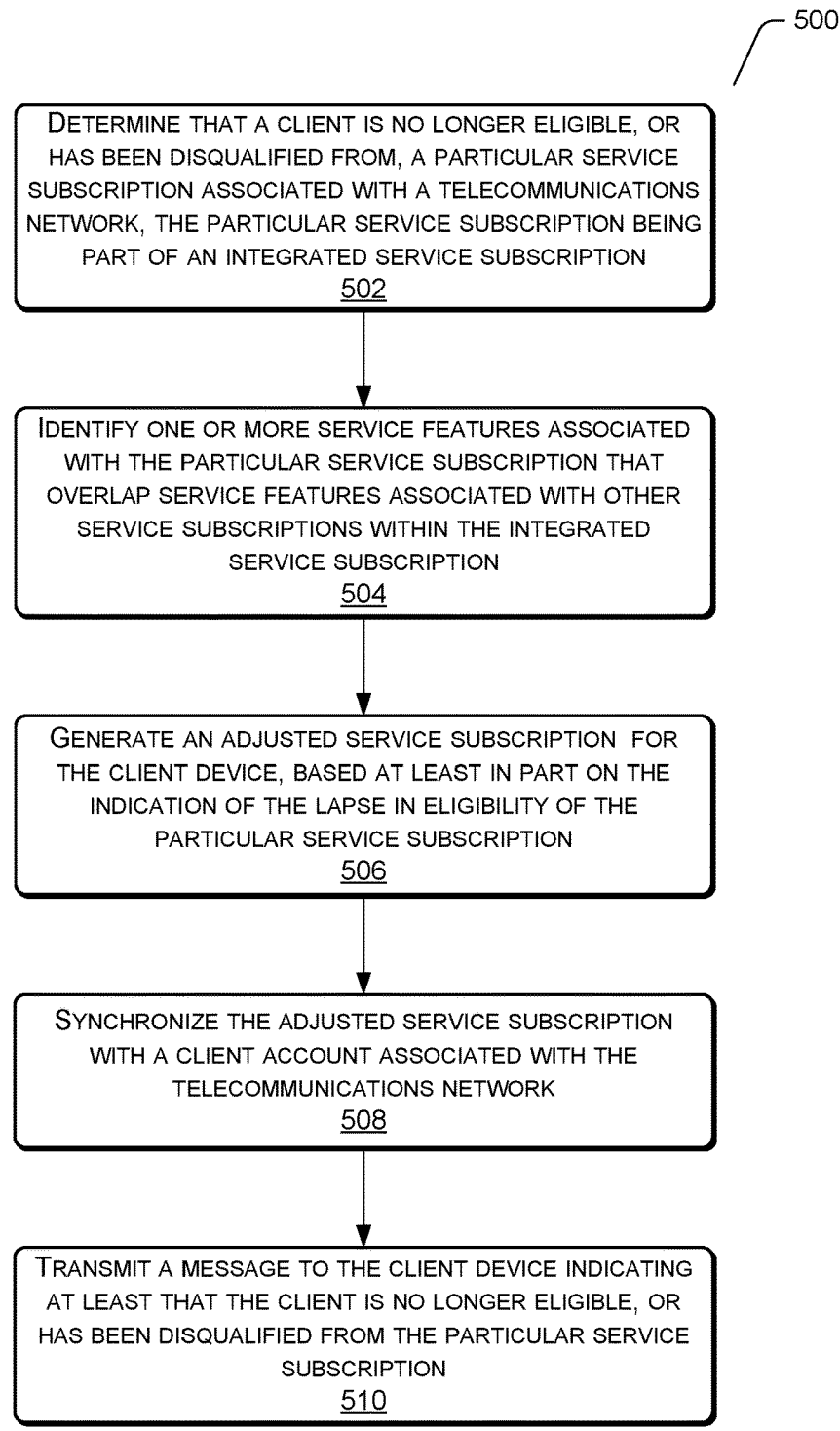
FIG. 5 illustrates a block diagram of a telecommunication service subscription integration (TSSI) system that adjusts an integrated service subscription that includes one or more service subscriptions to reflect real-time ineligibility, or disqualification from at least one service subscription.
Figure 6:
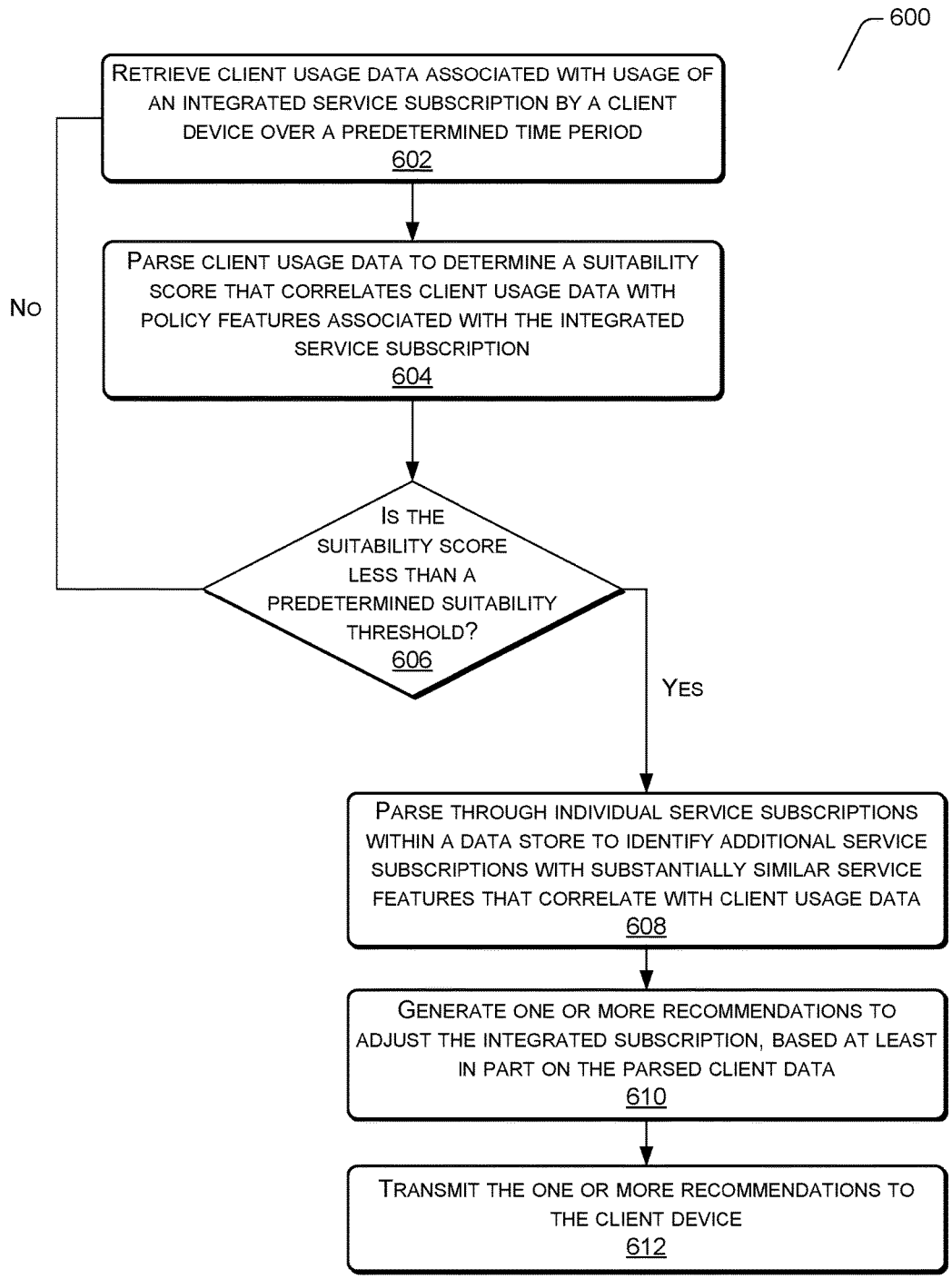
FIG. 6 illustrates a block diagram of a telecommunication service subscription integration (TSSI) system that monitors usage of an integrated service subscription on a telecommunications network, and in doing so, provides one or more recommendations of suitable service subscriptions.

FIGS. 4, 5, and 6 present processes 400, 500, and 600 that relate to operations of the telecommunications service subscription integration system. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a block diagram of a telecommunication service subscription integration (TSSI) system that generates an integrated service subscription for voice and data communications over a telecommunications network. Particularly, the TSSI system may determine client eligibility of a client to enroll in a first and second service subscription. In one example, the first service subscription may complement the second service subscription. Further, client eligibility may be based at least in part on client profile data or financial capability to afford the subscription fee associated with the service subscriptions.

At 402, the TSSI system receive, from a client presently subscribed to a first service subscription, a request to subscribe to a second service subscription associated with a telecommunications network. In one example, the first service subscription and the second service subscription may operate concurrently on the telecommunications network. Each service subscription may be configured to provide a client device with at least one of voice-communications over the telecommunications network, a short messaging service (SMS), a multimedia messaging service (MMS), data communications over the telecommunications network, or any combination thereof.

At 404, the TSSI system may determine whether the client is eligible for the second service subscription. In some examples, client eligibility may be based at least in part on client profile data and a financial ability to pay a subscription fee associated with the service subscriptions.

In one non-limiting example, the second service subscriptions may offer a free, or low-cost, service subscription, based at least in part on client profile data. Client profile data may include a client residential geographic location, level of education, employment status, employment place, annual income, an indication of enrollment within one or more government assistance programs, or any combination thereof. In this example, a client may qualify for a free service subscription based on one or more criteria, such an earned annual income that is less than a predetermined income threshold, enrollment in one or more government assistance programs, a combination of both, or any other qualifying criteria by which the service subscription is offered. The free service subscription may be offered by a government entity or a non-government entity, each of which may be affiliated with the telecommunications service provider.

At 406, the TSSI system may determine that the client is eligible for the second service subscription. In doing so, the TSSI system may generate an integrated service subscription that aggregates the first service subscription and the second service subscription. In one example, the first service subscription and the second service subscription may complement one another, without including overlapping service features. For example, the first service subscription may offer a time allotment for voice communications, an allotment of SMS messages, and an allotment of MMS messages, while the second service subscription may include a data allotment for data communications. In this example, the integrated service subscription may include the combined, complementary, service features of the first service subscription and the second service subscription.

In another example, the first service subscription and the second service subscription may include overlapping service features. For example, the first and second subscriptions services may each include any one of a data allocation for data communications, a time allotment for voice communications, a number of SMS messages, or a number of MMS messages. In this instance, the TSSI system may generate the integrated service subscription by prioritizing the first service subscription over the second service subscription.

In another example, the TSSI system may generate an integrated service subscription that prioritizes use of overlapping service features on a per service feature basis. The TSSI system may determine a priority order of service features, based at least in part on one or more priority rules. The priority rules may be based at least in part on client input from a client associated with a client device (or SIM), a user input from an operator of the TSSI system, or a user input from an operator associated with the telecommunications service provider.

At 408, the TSSI system may synchronize the integrated service subscription with a client account associated with the telecommunications network. Further, the TSSI system may integrate billing policies associated with the integrated service subscription with a charging engine of the telecommunications network. In some examples, the TSSI system may synchronize billing policies associated with the integrated service subscription with a Policy and Charging Rules Function (PCRF) of a Policy Control and Charging (PCC) architecture associated with the telecommunications network.

At 410, the TSSI system may transmit a message to the client device indicating an approval and implementation of the integration service subscription. In some examples, the TSSI system may cause a display of the message on foreground of a user interface of the client device, overlapping an existing presentation on the user interface. In other examples, the TSSI system may transmit the message via an email service, SMS, MMS, or any communication protocol associated with the client device.

Returning to step 404, the TSSI system may determine that the client is not eligible for the first service subscription or the second service subscription. In doing so, process 400 may proceed to step 412. At step 412, the TSSI system may transmit a message to the client device indicating an ineligibility for at least one service subscription. In some examples, ineligibility may be based on client profile data or a financial capability to pay the subscription fee associated with the ineligible service subscription.

FIG. 5 illustrates a block diagram of a telecommunication service subscription integration (TSSI) system that adjusts an integrated service subscription that includes one or more service subscriptions to reflect real-time ineligibility, or disqualification from at least one service subscription. Particularly, the TSSI system may determine that a client is no longer eligible for a service subscription that is aggregated within the integrated service subscription. The TSSI system may identify service features associated with the ineligible service subscription that overlap service features associated with other service subscriptions of the integrated service subscription.

At 502, the TSSI system may determine that a client is no longer eligible, or has been disqualified from a particular service subscription associated with a telecommunications network that is part of an integrated service subscription. In one example, a client may no longer be eligible for a service subscription due to non-payment of a subscription fee associated with the service subscription. In another example, a client may no longer be eligible for a service subscription based on a change to client profile data associated with the client. For example, a client may have initially been eligible for a free, or low-cost, service subscription based on eligibility criteria such as annual income, enrollment in one or more government assistance program, or a combination of both. However, in response to determining that the client no longer satisfies the eligibility criteria (i.e., annual income is above a predetermined income threshold or the client is no longer enrolled in a government assistance program), the client may no longer be eligible for the free, or low-cost, service subscription.

At 504, the TSSI system may identify one or more service features associated with the particular service subscription that overlap service features associated with other service subscriptions within the integrated service subscription. In doing so, the TSSI system may determine whether the integrated service subscription relies on the overlapping service feature associated with the particular service subscription. For example, the TSSI system may determine that the integrated service subscription relies on a data allocation associated with by the ineligible, particular service subscription.

In doing so, the TSSI system may parse through the remaining service subscriptions of the integrated service subscription to identify an overlapping service feature to re-prioritize for use within the integrated service subscription. Continuing with the previous example, the TSSI system may select an overlapping data allocation of a second service subscription for use with the integration service subscription.

At 506, the TSSI system may generate an adjusted service subscription for the client device, based at least in part on the indication of the lapse in eligibility of the particular service subscription. In one example, client may have initially been enrolled in the particular service subscription (now ineligible or disqualified) and a second service subscription. Further, the adjusted service subscription may reflect re-prioritization of overlapping service features, as discussed in step 504. For example, the particular service subscription and the second service subscription may both include a time-allotment for voice communications over the telecommunications network. As a result, the adjusted service subscription may revert priority of voice communications to the second service subscription.

Additionally, the TSSI system may identify service features associated with the particular service subscription that do not overlap with the second service subscription, and thus will no longer be available to the client. For example, unlike the second service subscription, the particular service subscription may include a data allocation for data communications over the telecommunication network. Thus, in this example, the adjusted service subscription, would not include a data allocation for data communications over the telecommunications network.

At 508, the TSSI system may synchronize the adjusted service subscription with a client account associated with the telecommunications network. Further, the TSSI system may integrate billing policies associated with the adjusted service subscription with a charging engine of the telecommunications network. In some examples, the TSSI system may synchronize billing policies associated with the adjusted service subscription with a Policy and Charging Rules Function (PCRF) of a Policy Control and Charging (PCC) architecture associated with the telecommunications network.

At 510, the TSSI system may transmit a message to the client device indicating that the client is no longer eligible, or has been disqualified from, an enrolled, particular service subscription. Further, the message may further include service features associated with the adjusted service subscription, which accounts for the exclusion of the particular service subscription. The TSSI system may cause a display of the message in a foreground of a user interface of the client device, overlapping an existing presentation on the user interface. In other examples, the TSSI system may transmit the message via an email service, SMS, MMS, or any other communication protocol associated with the client device.

FIG. 6 illustrates a block diagram of a telecommunication service subscription integration (TSSI) system that monitors usage of an integrated service subscription on a telecommunications network, and in doing so, provides one or more recommendations of suitable service subscriptions.

At 602, the TSSI system may retrieve client usage data associated with usage of an integrated service subscription on a telecommunications network, by a client device over a predetermined time period. Particularly, the TSSI may retrieve client usage data associated with the client device by monitoring the client device on a continuous basis, per a predetermined schedule, or in response to a triggering event. The predetermined schedule may correspond to a predetermined time interval, such as one hour, three hours, or 24 hours. Any predetermined time interval is possible. Moreover, the triggering event may correspond to receipt of an indication that the integrated service subscription has exceeded an allotment associated with voice or data communications over the telecommunications network. Further, the triggering event may correspond to receipt of an indication that a client is no longer eligible, or has been disqualified, from an individual service subscription associated with the integrated service subscription.

Further, the client usage data may correspond to an amount of data usage or a rate of data usage associated with data communications over the telecommunications network, usage of a time allotment for voice communications over the telecommunications network, a number of SMS sent over the telecommunications network, a number of MMS messages sent over the telecommunications network, or any combination thereof.

At 604, the TSSI system may parse client usage data to determine a suitability score that correlates client usage data with policy features associated with the integrated service subscription. The suitability score may quantify whether an allotment associated with a service feature correlates with the actual client usage. The suitability score may be alphanumeric (i.e., 0 to 10, or A to F), descriptive (i.e., low, medium, or high), based on color (i.e., red, yellow, or green), or any other suitable rating scale, or any combination thereof.

In a non-limiting example, an integrated service subscription may include a time allotment of 450 min per 30-day subscription period. The TSSI system may parse client usage data to determine that the time allotment used over the first ten days of the subscription period amounts to 45 min (i.e., 10% of time allotment used over 33% of the subscription period). Thus, the suitability score associated with the voice communication feature may be expressed as a low score (i.e., 0 to 3, low, or red), indicating that the current time allotment for voice communication is unsuitably high relative to actual client usage.

At 606, the TSSI system may determine whether the suitability score associated with a particular service feature of the integrated service subscription is less than a predetermined suitability threshold. The predetermined suitability threshold may be set by an operator of the TSSI system, or a client associated with the client device. In one example, the predetermined suitability threshold may correspond to a mean score value of the suitability score (i.e., a mean value may be expressed as 5, medium, or yellow). In other words, a service feature with a suitability score that is less than a predetermined suitability threshold suggests that the service feature does not correlate with actual client usage of the service feature.

At 608, in response to determining that the particular service feature has a low suitability score (i.e., the suitability score is less than the predetermined suitability threshold), the TSSI system may parse through individual service subscriptions within a data store to identify additional service subscriptions with similar types of service features that correlate with the client usage data. The TSSI system may determine suitability scores for each service feature of the additional service subscriptions. In doing so, the TSSI system may select an additional service subscription that includes a service feature with a higher suitability score relative to the particular service feature of the integrated service subscription.

For example, consider the above data usage example of a client device using four gigabytes of a five-gigabyte data allocation over the first ten days of a 30-day subscription period (i.e., 80% of data allotment used over 33% of the subscription period). In this example, an additional service subscription that includes an eight gigabyte data allotment per 30-day subscription period (i.e., service feature) would render an improved suitability score (i.e., 50% of data allotment used over 33% of the subscription period) relative to the original service feature of the integrated service subscription.

At 610, the TSSI system may generate one or more recommendations to adjust the integrated service subscription, based at least in part on the relative suitability score of the service feature within the integrated service subscription, and a service feature within an additional service subscription.

At 612, the TSSI system may transmit the one or more recommendations as a message to the client device. The TSSI system may cause display of the message in a foreground of a user interface of the client device, overlapping an existing presentation on the client device. In other examples, the TSSI system may transmit the message via an email service, SMS, MMS, or any other communication protocol associated with the client device.

Returning to step 606, the TSSI system may determine that the suitability score is greater than a predetermined suitability threshold, based at least in part on the parsed client usage data. In other words, the TSSI system may determine that the service feature of the integration service subscription correlates with actual client usage. In doing so, process 600 may proceed to step 602, such that the TSSI system continues to monitor the client usage data associated usage of the integrated service subscription for a predetermined time period.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:
1. A system comprising:
one or more processors:
memory coupled to the one or more processors, the memory including one or more modules that are executable by the one or more processors to:
receive, from a client device subscribed to a first service subscription, a request to subscribe to a second service subscription, the first service subscription and the second service subscription being associated with an operation of the client device over a telecommunications network;

determine whether the client device is eligible for the second service subscription, based at least at least in part on client profile data associated with the client device;

identify a first set of service features that are associated with the first service subscription, the first set of service features including a first voice service feature, a first Short Message Service (SMS) service feature, and a first data service feature;

identify a second set of service features that are associated with the second service subscription, the second set of service features including a second voice service feature, a second SMS service feature, and a second data service feature;

generate an integrated service subscription that prioritizes application of at least one first service feature from the first set of service features and at least one second service feature from the second set of service features on the telecommunication network, based at least in part on one or more priority rules and a determination that the client device is eligible for the second service subscription, wherein the at least one first service feature is different from the at least one second service feature; and synchronize the integrated service subscription with a client account associated with the telecommunications network.

2. The system of claim 1, wherein the one or more modules are further executable by the one or more processors to:

retrieve client profile data associated with the client device, the client profile data including at least an indication of enrollment in one or more government assistance programs, and wherein, to determine that the client device is eligible for the second service subscription is based at least in part on the indication of enrollment in one or more government assistance programs.

3. The system of claim 1, wherein the one or more modules are further executable by the one or more processors to:

retrieve client profile data associated with the client device, the client profile data including at least an income associated with the client device, and wherein, to determine that the client device is eligible for the second service subscription is based at least in part on the income being less than a predetermined income threshold.

4. The system of claim 1, wherein the one or more modules are further executable by the one or more processors to:

cause, a user interface associated with the client device, to a display selectable options to prioritize the first service subscription or the second service subscription; and receive, a client input that corresponds to at least one selection to prioritize the at least one first service feature from the first set of service features or the at least one second service feature from the second set of service features, wherein, to generate the integrated service subscription is further based at least in part on the client input.

5. The system of claim 1, wherein the integrated service subscription includes a voice service feature and a data service feature.

6. The system of claim 1, wherein the one or more modules are further executable by the one or more processors to:

determine that a client associated with the client device is no longer eligible for the first service subscription, based at least in part on non-payment of a service fee associated with the first service subscription for a predetermined time interval;

adjust the integrated service subscription to create an adjusted service subscription by removing the at least one first service feature of the first set of service features;

synchronize the adjusted service subscription with the client account associated with the telecommunications network; and transmit an additional message to the client device indicating an implementation of the adjusted service subscription.

7. The system of claim 1, wherein the one or more modules are further executable by the one or more processors to:

determine that a client associated with the client device is no longer eligible for the first service subscription, based at least in part on a change in client profile data, the change in client profile data corresponding to at least one of an increase in annual income or an indication that the client is no longer enrolled in one or more government assistance programs;

adjust the integrated service subscription to create an adjusted service subscription by removing the at least one first service feature of the first set of service features;

synchronize the adjusted service subscription with the client account associated with the telecommunications network; and transmit an additional message to the client device indicating an implementation of the adjusted service subscription.

8. The system of claim 1, wherein the one or more modules are further executable by the one or more processors to:

quantify billing policies associated with services features of the integrated service subscription, the service features of the integrated service subscription including at least a voice service feature and a data service feature; and synchronize the billing policies with a charging engine of the telecommunications network.

9. The system of claim 1, wherein the one or more modules are further executable by the one or more processors to:

monitor, client usage data associated with the integrated service subscription over a predetermined time interval, the client usage data corresponding to usage of an allotment of a first integrated service feature of the integrated service subscription, the first integrated service feature corresponding to one of the at least one first service feature or the at least one second service feature;

generate a first suitability score for the first integrated service feature, based at least in part on the client usage data; and recommend the second service subscription that includes a second integrated service feature, in response to the first suitability score being less than a predetermined suitability threshold, the second integrated service feature having a second suitability score that is greater than the first suitability score, and wherein, the first integrated service feature and the second integrated service feature correspond to a voice service feature, or the first integrated service feature and the second integrated service feature correspond to a data service feature.

10. The system of claim 1, wherein the one or more modules are further executable by the one or more processors to:

determining that application of a prioritized service feature of the integrated service subscription has been exhausted, the prioritized service feature corresponding to one of the at least one first service feature or the at least one second service feature; and configuring the integrated service subscription to revert to a lesser prioritized service feature.

11. The system of claim 1, wherein the at least one first service feature corresponds to a data service feature, and wherein the integrated service subscription is further configured to prioritize use of the at least one first service feature for Voice over Internet Protocol (VoIP) communications relative to data communications, based at least in part on one or more priority rules.

12. A computer-implemented method, comprising:

under control of one or more processors:

receiving, from a client device that is currently subscribed to a first service subscription, a request to subscribe to a second service subscription, the first service subscription and the second service subscription being associated with operation of the client device over a telecommunications network, and wherein the first service subscription includes a plurality of first service features and the second service subscription includes a plurality of second service features;

determining that the client device is eligible for the second service subscription, based at least in part on client profile data associated with the client device;

generating an integrated service subscription that aggregates and prioritizes application of at least one of the plurality of first service features and at least one of the plurality of second service features over the telecommunication network over the telecommunication network, the at least one of the plurality of first service features being different from the at least one of the plurality of second service features; and synchronizing the integrated service subscription with a client account associated with the telecommunications network.

13. The computer-implemented method of claim 12, further comprising:

receiving a client input, from a user interface associated with the client device, the client input corresponding to at least one selection to prioritize application of the at least one of the plurality of first service features or the at least one of the plurality of second service features, and wherein, generating the integrated service subscription is further based at least in part on the client input.

14. The computer-implemented method of claim 12, further comprising:

receiving a first client input that prioritizes application of a first voice service feature associated with the first service subscription relative to a second voice service feature associated with the second service subscription;

receiving a second client input that prioritizes application of a first data service feature associated with the first service subscription relative to a second data service feature associated with the second service subscription, selecting, as a selected voice service feature, the first voice service feature, based at least in part on the first client input; and selecting as a selected data service feature, the first data service feature, based at least in part on the second client input, and wherein, generating the integrated service subscription includes the selected voice service feature and the selected data service feature, the selected voice service feature and the selected data service feature being associated with a different one of the first service subscription and the second service subscription.

15. The computer-implemented method of claim 12, further comprising:

monitoring client profile data associated with the client device, the client profile data including at least one of an annual income or an indication of enrollment in one or more government assistance programs;

determining that the client device is no longer eligible for the first service subscription, based at least in part on the client profile data;

adjusting the integrated service subscription to create an adjusted service subscription by removing the at least one of the plurality of first service features; and synchronizing the adjusted service subscription with the client account associated with the telecommunications network.

16. The computer-implemented method of claim 12, further comprising:

determining that client device is no longer eligible for the second service subscription, based at least in part on non-payment of a subscription fee associated with the second service subscription;

adjusting the integrated service subscription to create an adjusted service subscription by removing the at least one of the plurality of first service features; and synchronizing the adjusted service subscription with the client account associated with the telecommunications network.

17. The computer-implemented method of claim 12, further comprising:

monitoring, client usage data associated with the integrated service subscription over a predetermined time interval, the client usage data corresponding to usage of an allotment of a service feature associated with the integrated service subscription;

generating a first suitability score for the service feature, based at least in part on the client usage data;

determining that the first suitability score is less than a predetermined suitability threshold;

retrieving, from a data store, an additional service subscription that includes an additional service feature, the additional service feature having a second suitability score that is greater than the first suitability score; and transmitting, to the client device, a recommendation of the additional service subscription.

18. One or more non-transitory computer-readable media storing computer-executable instructions that, when executed on one or more processors, cause the one or more processors to perform acts comprising:

receiving, from a client device that is currently subscribed to a first service subscription, a request to subscribe to a second service subscription, wherein the first service subscription includes a plurality of first service features and the second service subscription includes a plurality of second service features, the first service subscription and the second service subscription being associated with an operation of the client device over a telecommunications network;

determining that the client device is eligible for the second service subscription, based at least in part on client profile data associated with the client device;

prioritizing application of at least one first service feature of the plurality of first service features and at least one second service feature of the plurality of second service features over the telecommunication network, based at least in part on one or more priority rules, the at least one first service feature being different from the at least one second service feature;

generating an integrated service subscription that aggregates the at least one first service feature and the at least one second service feature;

synchronizing the integrated service subscription with a client account associated with a telecommunications network; and transmitting a message to the client device indicating that the integrated service subscription is in effect.

19. The one or more non-transitory computer-readable media of claim 18, further comprising:

determining, at a point in time after synchronizing the integrated service subscription with the client account, that a subscription fee associated with the second service subscription is unpaid;

adjusting the integrated service subscription to create an adjusted service subscription by removing service features associated with the second service subscription;

synchronizing the adjusted service subscription with the client account associated with the telecommunications network; and transmitting an additional message to the client device indicating that the second service subscription is no longer in effect.

20. The one or more non-transitory computer-readable media of claim 19, wherein the point in time is a first point in time, and further comprising:

determining at a second point in time that follows the first point in time, that the subscription fee associated with the second service subscription has been paid;

synchronizing the integrated service subscription with the client account associated with the telecommunications network, based at least in part on determining that the second service subscription has been paid; and transmitting another message to the client device indicating that the integrated service subscription that includes the second service subscription is in effect.

* * * * *